United States Patent Office 3,824,095
Patented July 16, 1974

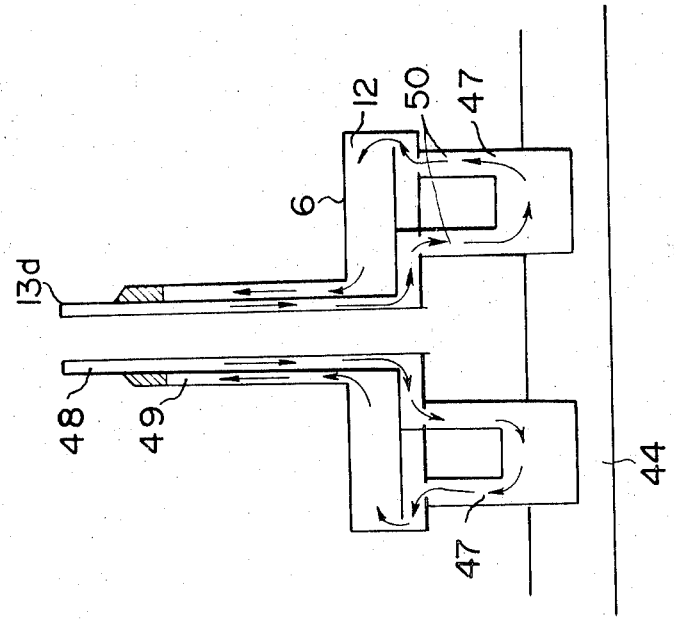
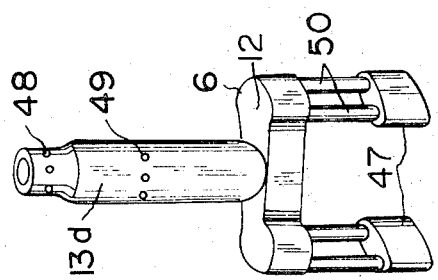

3,824,095
METHOD AND APPARATUS FOR THE PRETREATMENT OF MOLTEN PIG IRON
Ryo Ando, Yokohama, Japan, assignor to Nippon Kokan Kabushiki Kaisha, Tokyo, Japan
Filed Aug. 9, 1972, Ser. No. 279,183
Claims priority, application Japan, Aug. 26, 1971, 46/65,460
Int. Cl. C21c 7/00
U.S. Cl. 75—58    5 Claims

ABSTRACT OF THE DISCLOSURE

The method of pretreatment of molten pig iron comprises the steps of disposing four driving shafts at the respective corners of a square, each driving shaft driving a pair of horizontally spaced apart vertical driving members with their lower ends immersed in the portions of the molten pig iron to be treated near the upper surface thereof, incorporating a pretreating agent onto the upper surface, and rotating adjacent driving shafts in the opposite directions so as to stir the portions of the molten pig iron near the interface between the pretreating agent and the molten pig iron.

The apparatus for carrying out the method is constructed such that, the driving shafts, the stirring members and means for driving the driving shafts are supported by a non-rotating shaft and that the non-rotating shaft is adjusted in the vertical direction.

BACKGROUND OF THE INVENTION

This invention relates to a method and apparatus for the pretreatment of molten pig iron, such as desulfurization or dephosphorization of molten basic pig iron, for steel making incorporation of ferrosilicon into basic pig iron for the purpose of converting it into foundry pig iron or desulfurization and dephosphorization treatment of basic pig iron for ductile cast iron.

A number of methods and apparatus for the pretreatment of pig iron have already been proposed. For example, with regard to the method and apparatus for removing sulfur from molten pig iron while it is contained in a ladle, a large number of proposals have been made and are now used in commercial productions. In order to remove sulfur from molten pig iron it has been considered essential (1) to stir the entire body of the molten pig iron in the ladle and (2) to stir the interface between the molten pig iron and the desulfurization agent. It has been considered important to accelerate these two stirring operations and such stirring operations have been performed by a stirring mechanism common to said two stirring operations. However, the prior art method did not consider separately the effects of these two stirring operations. Especially, the stirring and admixture of the molten pig iron and the desulfurization agent were not sufficient. To improve this stirring operation, I have recently made a proposal which is disclosed in Japanese Patent Publication No. 39,332/70 or its counterparts, U.S. Pat. No. 3,567,204 and No. 3,592,629. This proposal has a big advantage over the conventional method and is characterized in that it renders easy mass production. According to this proposal vertical rotary stirring rods are immersed into the surface portion of the molten pig iron. However, as will be discussed later, in a mass production installation, the stirring mechanism including the stirring rods becomes bulky. With such a large size mechanism, the load caused by the eccentric motion increases, thereby damaging the mechanism.

SUMMARY OF THE INVENTION

It is an object of this invention to provide an improved method and apparatus for the pretreatment of molten pig iron wherein above described problem of load caused by the eccentric motion encountered in the original invention can be eliminated.

Another object of this invention is to provide an improved method and apparatus for the pretreatment of molten pig iron capable of efficiently utilizing a pretreating agent such as a desulfurization agent, a dephosphorization agent and a silication agent.

According to one aspect of this invention there is provided a method of pretreatment of molten pig iron comprising the steps of disposing four driving shafts at the respective corners of a square, each driving shaft driving a pair of horizontally spaced apart vertical stirring members with their lower ends immersed in the portions of the molten pig iron to be treated near the upper surface thereof, incorporating a pretreating agent onto the upper surface, and rotating adjacent driving shafts in the opposite directions so as to stir the portions of the molten pig iron near the interface between the pretreating agent and the molten pig iron.

According to another aspect of this invention, there is provided an apparatus for pretreating molten pig iron comprising a vessel adapted to contain molten pig iron to be treated, four driving shafts disposed at the respective corners of a square, a pair of horizontally spaced apart vertical stirring members mounted on the lower end of each driving shaft, the stirring members having a length such that the lower ends thereof are adapted to be immersed in the portions of the molten pig iron near the interface between the molten pig iron and a pretreatment agent incorporated onto the upper surface of the molten pig iron, and means for driving adjacent driving shafts in the opposite directions.

BRIEF DESCRIPTION OF THE DRAWINGS

The invention can be more fully understood from the following detailed description taken in conjunction with the accompanying drawings in which:

FIG. 9 is a vertical sectional view of stirring vanes of metal showing a cooling circuit; and FIG. 10 shows a perspective view of the stirring vanes.

DESCRIPTION OF THE PREFERRED EMBODIMENTS

Figure 1:
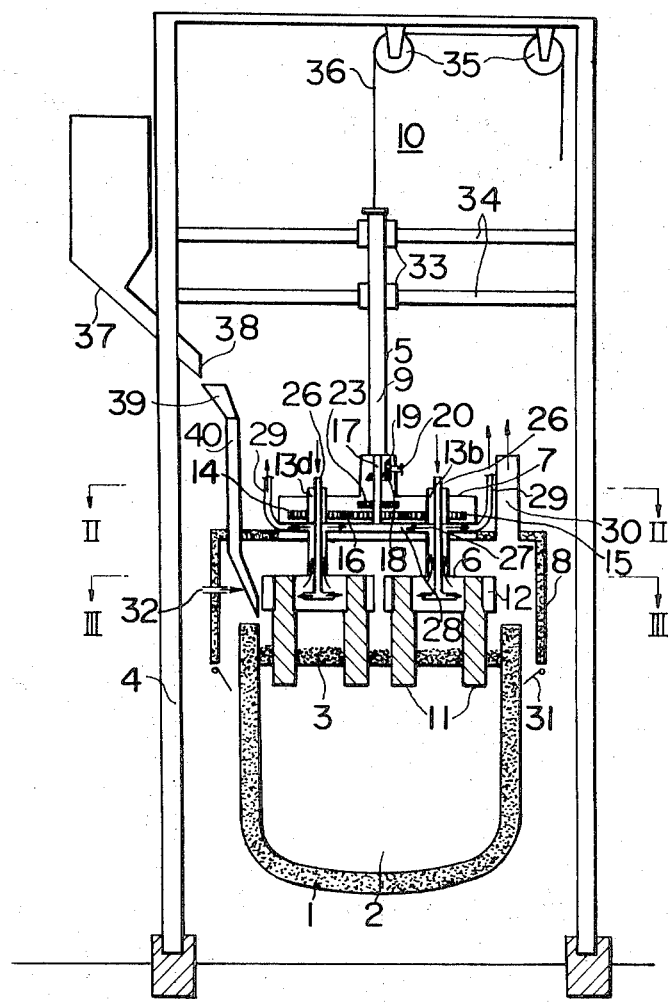
FIG. 1 shows a diagrammatic sectional view of the apparatus embodying the invention.

The apparatus shown in FIG. 1 is designed for the desulfurization operation and comprises a ladle or tank 1 mounted on a carriage (not shown) and is nearly filled with molten pig iron 2 which is covered by a desulfurization agent 3. In this embodiment, calcium carbide is used as the desulfurization agent. The upper structure 5 of the desulfurization apparatus is supported by a frame work 4. The upper structure comprises stirrers 6, a driving mechanism 7 for the stirrers, a protective cover 8, a supporting shaft 9, and positioning means 10 which hangs and moves in the vetical direction the upper structure. Each stirrer 6 comprises a pair of parallel vertical stirring rods 11, a driving shaft 13 and a fixture 12 for connecting the stirring rods to the driving shaft. When driven by the driving shaft 13 the stirring rods 11 are moved along circles to vigorously stir the portions of the molten pig iron near the interface between it and the desulfurization agent. Usually, two stirring rods are mounted on one driving shaft, but only one rod may be used for the apparatus of small size in which case it is advantageous to use a balancing weight for preventing unbalance of the driving body. Four stirrers 6 are used in this embodiment. As diagrammatically shown in FIG. 2, the axes $a$ and $c$ of diametrically opposite shafts are rotated in the same direction and the axes $b$ and $d$ are also rotated in the same direction but in the opposite direction with respect to that of axes $a$, $c$ and $b$, $d$. The rotational number of all four axes is identical to each other.

The stirring rods of these four stirrers are arranged such that a straight line interconnecting the axes of two stirring rods mounted on a driving shaft having the axis $a$ is parallel with a straight line interconnecting the axes of the stirring rods mounted on a driving shaft having the axis $c$. The stirring rods mounted on the shafts having the axes $b$ and $d$ should also have the same relationship. It is also necessary to mount the stirring rods such that when the axes of the stirring rods mounted on the driving shafts having the axes $b$ and $d$ are brought into alignment along a straight line, the straight lines respectively interconnecting the axes of the stirring rods mounted on the shafts having the axes $a$ and $c$, respectively should be parallel with the above mentioned straight line. Thus, the axes $a$, $b$, $c$ and $d$ are disposed on the respective corners of a square. The relative arrangement of the stirring rods will become more apparent from the following description regarding the driving mechanism 7. Gears 14, 15 and 16 having the same diameter are mounted on the driving shafts having the axes $d$, $b$ and $e$. The driving power of an electric motor (not shown) is transmitted to a shaft 20 via a speed reducer (not shown) and thence to bevel gears 19, 18 via a shaft 20. The driving shaft 17 having the axis $e$ is rotated thereby to rotate shafts 13$b$, 13$d$ in the same direction. Gears 21, 22, 23, 24 and 25 are mounted on the driving shafts having axes, $a$, $c$, $e$, $f$ and $g$, respectively. Gears 21, 22, and 23 have the same diameter. Similarly, the gears 24 and 25 also have the same diameter. When shaft 17 having the axis $e$ is rotated, its torque is transmitted to shafts 13$a$ and 13$c$ via gears 24 and 25 respectively. In this manner, as the shaft 17 rotates, shafts 13$a$, 13$b$, 13$c$ and 13$d$ rotate in the manner as above described. It should be understood that these shafts can also be constructed and driven by other known mechanisms than that shown.

Heat insulating and dust preventing means will be described as follows. Since the apparatus is used to treat and stir the molten pig iron heated to a high temperature of about 1400° C., it is necessary to provide some means for preventing the damage caused by the hot sputtering particles or by the radiant heat of the molten metal surface of the high temperature pig iron and from the surface thereof. The stirring rods are made of graphite or a refractory material of the brick type durable to heat shock. Fixture 12 and driving shafts 13$a$, 13$b$, 13$c$ and 13$d$ are cooled by water. As shown, each shaft is provided with a inner tube 26 with its lower end opened in the inside of the fixture 12. The water supplied through a hose (not shown) connected to tube 26 flows into the inside of fixture 12 through tube 26 as shown by arrows. Suitable buffle plates, not shown, may be provided in the fixture 12 to improve cooling efficiency. Then the water flows through the space on the outside of the tube 26 and then enters into a chamber 28 at the bottom of the driving mechanism 7 through openings 27 provided at the intermediate points along the driving shafts. Suitable buffle plates, not shown, can also be formed in chamber 28. Thereafter, the cooling water is discharged through a discharge pipe 29. To prevent dust from collecting on the driving mechanism a hood 8, which also acts as a heat shield, is mounted beneath the chamber 28. The fume generated in the tank 2 is discharged through an exhaust pipe 30 connected to hood 8. The exhaust pipe 30 may be connected to a suitable dust precipitator, not shown. A curtain type sealing means 31 is connected to the lower end of hood 8 for sealing the space between the outer shell of the ladle and the hood. A gas inlet port 32 is formed through the hood for introducing reducing gas or neutral gas for improving the efficiency of desulfurization or for preventing the wear by oxidation of the stirring rods where they are made of graphite. The gas admitted in this manner is discharged through exhaust pipe 30 and burns at the exit thereof when combustible gas is used. The hood is provided with a lining of refractory material. The assembly of stirrers 6, drive mechanism 7 and hood 8 is supported by shaft 9 which is guided by guide members 33 for vertical movements. The guide members 33 are supported by cross-bars 34 connected to frame work 4. Shaft 9 is moved vertically for the purpose of dipping the lower ends of the stirring rods in the upper layer of the molten pig iron and of pulling upwardly the lower ends out of the molten pig iron. When positioned at a desired position, the rod is fixedly secured by suitable clamping means, not shown, provided inside or near the guide member 33. The shaft 9 is moved in the vertical direction by a suitable winch provided with braking means, not shown, through a cord 36 passing around pulleys 35.

The apparatus described above operates as follows. A quantity of the desulfurization agent is loaded in a hopper 37. Before commencement of the refining operation, the stirring rods are held in their raised positions, and cooling water is passed through tubes 26. The curtain type sealing device is opened so as to provide a sufficiently large space about the ladle. A rotary chute 39 at the upper end of feed pipe 40 for conveying the desulfurization agent is positioned not to align with the output port of hopper 37.

After substantially removing the slag formed in a blast furnace and floating on the molten pig iron 2 contained in ladle 1 which is carried by the carriage (not shown), the ladle 1 is brought to the position beneath the desulfurization apparatus.

The clamping devices at the guide members 33 are loosened to dip the lower ends of the stirring rods 11 into the surface layer of the molten pig iron by the operation of the winch and cord 36. After confirming that the lower ends of the stirring have been lowered to a predetermined depth, the clamping devices are reapplied to fix shaft 9 to the frame work 4 through cross-bars 34. Then the rotary chute 39 is brought into alignment with the discharge port of hopper 37. The curtain type sealing device 31 is operated to cause its lower end to contact with the ladle 1 for the purpose of preventing invasion of air. Then the neutral or reducing gas is admitted through opening 32 to surround the ladle 1. A hood (not shown) may be connected to the upper end of the exhaust pipe 30 to facilitate discharge of the gas. Of course, cooling water is passed through the stirrers 6 and the driving mechanism 7.

The desulfurization agent in the hopper 37 is supplied to the ladle 1 by opening a gate 38. The driving motor, not shown, rotates shaft 20 so as to rotate stirring rods. The time necessary for the stirring operation is about 15 minutes, during which the direction of rotation of the stirring rods is reversed alternately. Upon completion of the desulfurization operation, above described process steps are performed in the reverse order until the stirring rods are pulled out from the molten pig iron. The ladle is then pulled out from beneath the desulfurization apparatus. After removing the slag formed by the desulfurization process, the ladle is sent to a steel manufacturing factory. The invention has following advantages. As above described, since this invention is an improvement of my previous invention it is thought sufficient to merely describe the novel improvement. However, since there are many proposals regarding the method and apparatus for desulfurization, in order to have better understanding of the advantageous merits of this invention, the difference between the original invention and the prior art will firstly be discussed.

As shown described, in the art of desulfurization of pig iron two conditions have been deemed essential. One is "the stirring of the whole body of the molten pig iron in a ladle" and the other is "the admixture and stirring of the molten pig iron and overlying desulfurization agent." In the old methods prior to the original invention these two conditions have been satisfied by the forcible stirring operations and the two types of the stirring operations have been performed by a single stirring mechanism. Following are examples of such prior art methods.

(1) The Shaking Ladle Method or DM Convertor

According to this method, a ladle containing molten pig iron is moved eccentrically in the horizontal plane for the purpose of stirring the whole body of the molten pig iron and entraining the desulfurization agent into the molten pig iron by the waves and eddies which are created at a predetermined number of revolutions or at an instant at which the direction of rotation is reversed.

(2) The Impeller Method

According to this method the whole body of pig iron is stirred by means of an impeller which is constructed and arranged to entrain the desulfurization agent into the molten pig iron, thereby effecting intimate contact therebetween, by the eddies created by the impeller. The so-called Östberg method utilizes a special impeller. More particularly, the impeller is made hollow, so that as the impeller is rotated, the molten pig iron is caused to circulate rapidly throughout the ladle by the pumping action of the impeller.

(3) The Method of Bubbling $N_2$

This method has been used from the early stage of development. $N_2$ gas is introduced into the molten pig iron either through a lance or bubbled through a porous brick block located at the bottom of the ladle. In any case, gas, such as $N_2$, is bubbled to stir the whole body of the molten pig iron. At the same time, waves formed on the surface of the molten pig iron when the bubbles reach the surface are used to admix the desulfurization agent and the molten pig iron.

Different from these prior art methods, the original invention is based on the entirely different principle. More particularly, the original invention is based on the recognition that one condition, that is "the stirring of the whole body of the molten pig iron" is not necessary but that "the condition of the admixture and stirring of the desulfurization agent and the molten pig iron," more correctly, "the stirring of the portions of the molten pig iron near the interface between the molten pig iron and the desulfurizing agent" is the necessary and sufficient condition. In the older methods prior to the original invention above described conditions have not been treated independently and in most of them, "the stirring of the portions near the interface" was not sufficiently strong. In the original invention, these factors have been fully investigated so as to assure sufficient stirring over the entire area of the interface.

Figure 4:
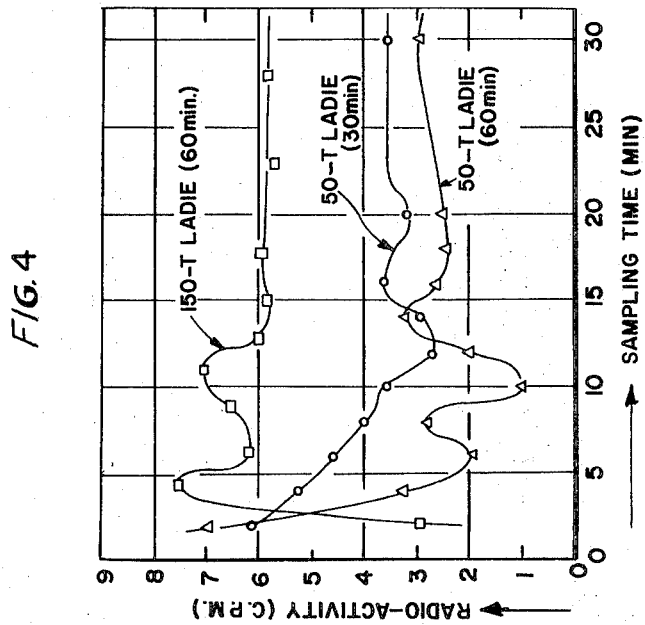
FIG. 4 is a graph showing the results of tests according to which the flow of the molten pig iron contained in a ladle was confirmed by incorporating radioactive gold into the ladle.

To determine that the stirring of the whole body of the molten pig iron is not necessary the following experiment was made and the result is plotted in FIG. 4 in which the numerals in the parentheses represents the time interval between the completion of charging of the molten pig iron in the ladle and the insertion of $^{198}Au$ and the abscissa represents the time between the insertion of $^{198}Au$ and sampling. The ordinate represents the intensity of the radio-activity measured. The wavy configuration of each curve shows the presence of the flow of the molten pig iron, whereas straight portions represent that $^{198}Au$ has been admixed homogeneously.

Figure 5:
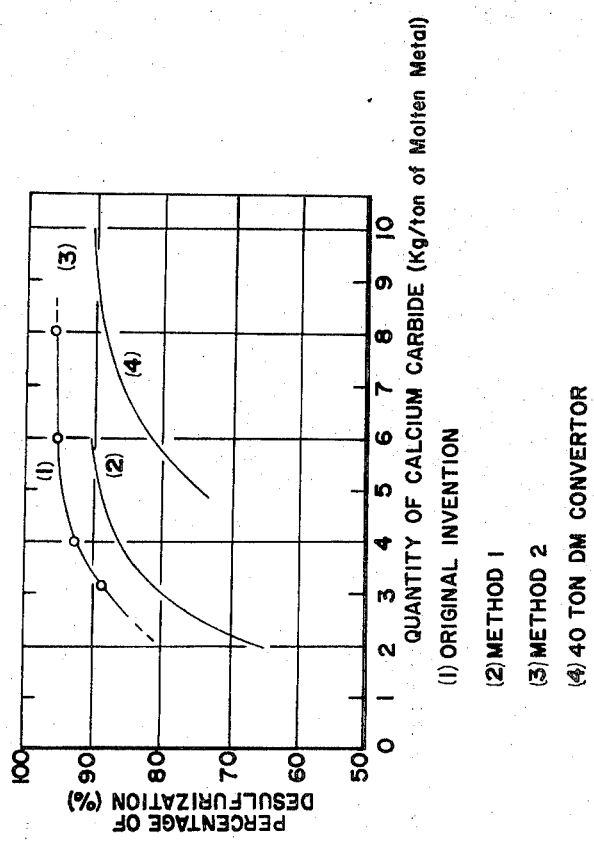
FIG. 5 is a graph showing the relationship between the quantity of a desulfurization agent and percentage of desulfurization.

The differences of said molten pig iron movement in the ladle disclosed a remarkable difference appears in the relationship between the quantity of the desulfurization agent and the percentage of desulfurization which is the most important characteristic of the desulfurization apparatus. FIG. 5 is a graph comparing these relationships of the original invention and the prior art methods. As fully disclosed in the specification of the original invention, according to the original invention, since the stirring rods or vanes are dipped only in the surface layer of the molten pig iron, the wear or erosion of the stirring rods or vanes can be reduced greatly.

The differences of the prior invention and the present invention have thus been explained. Such an apparatus of the prior invention has a plurality of stirring rods mounted to one holder which then is attached to the frame for horizontally eccentric movement. This method was meritorious in that a simple driving apparatus may be used for stirring a high temperature liquid as 1400° C. molten metal by moving a plurality of stirrers via one shaft. However, when this apparatus was applied to a big volume of molten metal, stirrers, the holder, the shaft and the frame for eccentric motion as well as the eccentric motion itself became greater.

Figure 6:
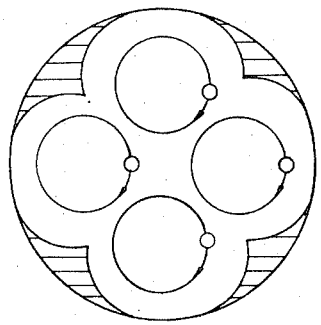
FIGS. 6 and 7 are diagrams showing the modes of stirring according to the original invention.
Figure 7:
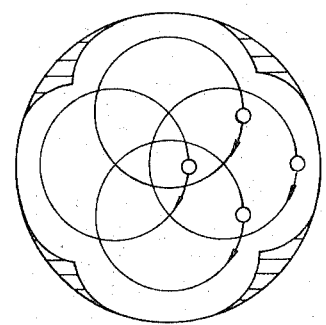

FIGS. 6 and 7 illustrate the loci of the stirring rods described on the surface of the molten pig iron according to the method of the original invention. In the case of FIG. 7 the eccentricity of rotation of the stirring rods is greater than that of the case shown in FIG. 6. Hatched areas in each figure represent the dead spaces in which the stirring is not sufficient so that portions of the desulfurization agent added are collected in these spaces thus can not contribute to the desulfurization reaction. By comparing FIG. 6 with FIG. 7, it can be noted that the area of the dead space is smaller in FIG. 7 than in FIG. 6. In this manner, in the original invention it is possible to decrease the area of the dead space by increasing the eccentricity of rotation of the stirring rod but when the eccentricity is increased, and the size of the apparatus is increased, there is seen difficulties in the structural construction of stirrer.

The present invention contemplates elimination of this problem. As above described shaft 9 does not rotate. Further, the driving shafts represented by axes 13a, 13b, 13c and 13d rotate in different directions. That is, adjacent shafts rotate in the opposite directions. For this reason, it is possible to increase the distance between the axial center of each fixture to the center of the stirring rods supported thereby, or the eccentricity of rotation of the stirring rod, thereby enabling to stir wider area with the same number of the stirring rods as the original invention. It is to be particularly noted that it is possible to prevent creation of the dead spaces notwithstanding of the fact that the shaft 9 is held stationary. When the driving shafts are rotated in the directions indicated by arrows shown in FIG. 3, the desulfurization agent is prevented from staying in the regions I and III by the effect of the waves created by the stirring motion. However, the desulfurization agent tends to stay in the regions II and IV. If the directions of rotations of respective driving shafts are reversed (not shown), that is, in the direction opposite to those shown by arrows, the desulfurization agent would not stay in regions II and IV but tend to stay in regions I and III. Accordingly, it is possible to completely eliminate the dead space by alternately reversing the direction of rotation of respective driving shafts.

In this manner, according to this invention it is possible to obtain the advantageous merit without rotating shaft 9 as in the original invention. For this reason, it is not necessary to provide a mechanism for rotating the shaft 9. This also simplifies the construction and mounting of the dust preventing and heat shielding cover 8, thus reducing the cost of installation and operation.

Following examples are given to illustrate the invention.

EXAMPLE 1

The results of the desulfurization treatment by using a 30 ton ladle shown in FIG. 1 are shown in Table 1.

TABLE 1

| Quantity of calcium carbide per ton of molten pig iron | Content of S in pig iron (percent) | | Percentage of desulfurization (percent) |
|---|---|---|---|
| | Before treatment | After treatment | |
| 3 kg./ton | 0.044 | 0.006 | 86 |
| 4 kg./ton | 0.038 | 0.004 | 89 |
| 5 kg./ton | 0.051 | 0.005 | 90 |
| 7 kg./ton | 0.058 | 0.004 | 93 |

In this example, each stirring rod had a diameter of 15 cm. and the driving shaft was rotated at a speed of 75 r.p.m. The depth of immersion of respective stirring rods was 20 cm. The total stirring time was 16 minutes and the direction of rotation was reversed with a period of 2 minutes.

Figure 2:
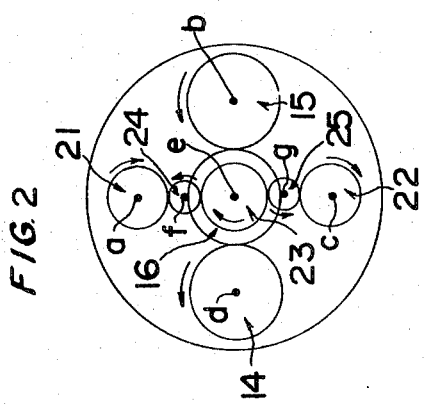
FIG. 2 is a cross-sectional view of the apparatus shown in FIG. 1 taken along a line II—II.
Figure 3:
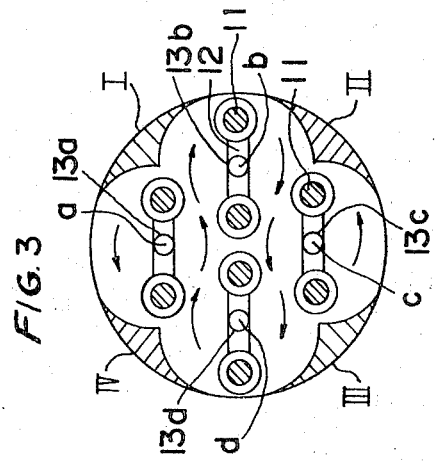
FIG. 3 is a similar view taken along a line III—III shown in FIG. 1.
Figure 8:
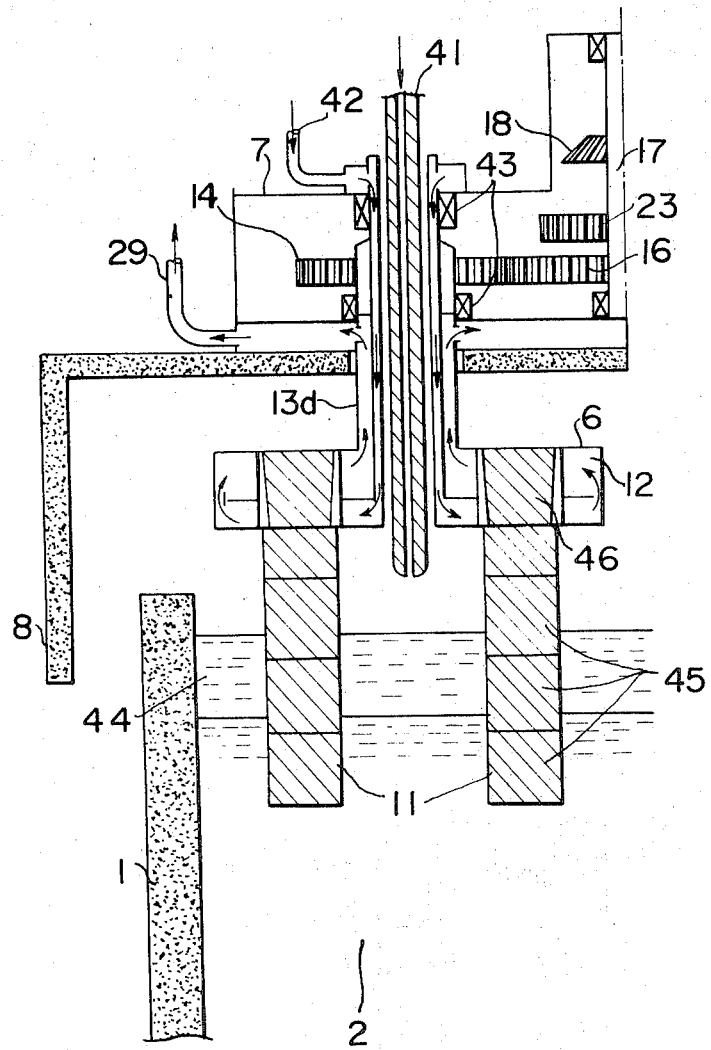
FIG. 8 is a vertical sectional view of modified apparatus designed for dephosphorization.

FIG. 8 shows a modified embodiment of this invention suitable for dephosphorization. The component parts identical to those shown in FIGS. 1 to 3 are designated by the same reference numerals. According to this modification, a water cooled oxygen lance 41 similar to that used in a conventional LD converter is inserted through driving shaft 13d. To accommodate the lance the diameter of shaft 13d is increased. Cooling water for cooling shaft 13d and fixture 12 for supporting the stirring rods 11 is supplied through a supply pipe 42, and is discharged through discharge pipe 29 after circulating through a passage shown by arrows. Driving shaft 13d is supported by bearings 43.

A dephosphorization agent consisting for example of limestone, fluorspar and mill scale is added to the ladle from hopper 37 (see FIG. 1) or through the oxygen lance 41 together with oxygen. As the result of the addition of the dephosphorization agent slag 44 is formed on the molten pig iron. In the case of the dephosphorization treatment, where the stirring rods are made of graphite they are heavily worn out. Accordingly, in this example, the upper portion 46 of the stirring rods is made of graphite whereas the lower portion 45 which is to be immersed in the molten pig iron 2 is made of a refractory material of the zirconia type. The stirring rods are fabricated in the same manner as the stopper used in a ladle for manufacturing steel. The stirring rods of this construction can also be used for desulfurization treatment. This is especially true where the apparatus is used for desulfurization treatment and thence for dephosphorization treatment.

Where it is desired to increase the percentage of dephosphorization to 80 to 90%, the temperature of the molten pig iron is also elevated so that even the refractory material of the zirconia type suffers a considerable wear. In such a case, it is advantageous to use metal vanes 47 shown in FIGS. 9 and 10. In this case, cooling water enters through openings 48 and discharges through openings 49 of shaft 13d after circulating through supporting pipes 50, vanes 47 and fixture 6 as indicated by the arrows shown in FIG. 9. The lower ends of the metal vanes 47 extend only to the half depth of the slag 44.

Incorporation of the ferrosilicon can be done without using any special apparatus. It can be loaded in hopper 37 (see FIG. 1) originally designed for accommodating the dephosphorization agent. In the case where it is desired to merely increase the content of silicon, the stirring rods may be made of graphite but for the dephosphorization treatment zirconia refractory material is preferred. In the latter case, it is impossible to use metal vanes

EXAMPLE 2

Dephosphorization treatment was carried out with the modified apparatus shown in FIG. 8. Table 2 below shows the operating conditions whereas Table 3 the results obtained.

TABLE 2

Operating Conditions

Flow quantity of oxygen:
  During the initial 10 minutes: 45–43 m.³/min.
  Succeeding 10 minutes: about 19 m.³/min.
Oxygen pressure:
  During the initial 10 minutes: 2.9–2.7 kg./cm.²
  Succeeding 10 minutes: 1.2–1.0 kg./cm.²
Dephosphorization agent:
  Limestone: 950 kg.
  Mill scale: 525 kg.
  Fluorspar: 150 kg.
  Soda ash: 450 kg.
Quantity of molten pig iron: 26.5 tons
Stirring time: 20 minutes
Stirring rods:
  Diameter: 15 cm.
  Immersion depth 10 cm.
Height of lance above liquid level: 900 mm.
Number of revolutions of the driving shaft: 75 r.p.m.

TABLE 3.—RESULTS OF TREATMENT

| | Composition of molten pig iron (percent) | | | | | Composition of slag (percent) | |
|---|---|---|---|---|---|---|---|
| | Before treatment | 10 min. after— | After completion | Percentage of removal | | 10 min. after— | After completion |
| C | 4.40 | 3.84 | 3.64 | 17 | T. Fe | 8.12 | 11.90 |
| Si | 0.87 | 0.14 | 0.023 | 96 | FeO | 8.65 | 8.94 |
| Mn | 0.70 | 0.35 | 0.29 | | SiO₂ | 42.23 | 13.88 |
| P | 0.125 | 0.120 | 0.050 | 60 | CaO | 20.22 | 43.19 |
| S2 | 0.045 | 0.041 | 0.021 | 53 | P | 0.026 | 0.68 |

EXAMPLE 3

Dephosphorization treatment was carried out with the apparatus equipped with the metal vanes shown in FIGS. 8 and 9 and supplied with oxygen through oxygen lances. Table 4 below shows the operating condition and Table 5 the results of treatment.

TABLE 4

Operating Conditions

Flow quantity of oxygen:
  During the initial 10 minutes: 50–30 m.³/min.
  Succeeding 15 min.: 18–16 m.³/min.
Oxygen pressure:
  During the initial 10 min.: 3.0–2.4 kg./cm.²
  Succeeding 15 min.: 1.2–0.8 kg./cm.²
Dephosphorization agent:
  Limestone: 1,020 kg.
  Mill scale: 640 kg.
  Fluorspar: 200 kg.
  Soda ash: 490 kg.
Quantity of molten pig iron: 27 ton
Stirring time: 25 min.
Position of stirring vanes: 15 cm. above liquid level
Number of revolutions of the driving shaft: 100 r.p.m.
Height of lances: 80 cm.

TABLE 5.—RESULTS OF TREATMENT

| | Composition of molten pig iron (percent) | | | | | Composition of slag (percent) | |
|---|---|---|---|---|---|---|---|
| | Before treatment | 10 min. after— | After completion | Percentage of removal | | 10 min. after— | After completion |
| C | 4.55 | 4.05 | 3.55 | 22 | T. Fe | 7.00 | 8.63 |
| Si | 0.83 | 0.15 | 0.05 | 94 | FeO | 8.07 | 7.21 |
| Mn | 0.80 | | 0.56 | | SiO₂ | 40.76 | 16.40 |
| P | 0.132 | 0.118 | 0.035 | 73 | CaO | 25.50 | 40.38 |
| S | 0.042 | | 0.018 | 57 | P | 0.018 | 1.15 |

EXAMPLE 4

Ferrosilicon incorporation tests were conducted with the apparatus shown in FIG. 1. The ferrosilicon incorporated contained 75% of Si. The results are shown in Table 6 below.

TABLE 6.—FERROSILICON INCORPORATION TEST

| | Quantity incorporated | Percent of— | | Yield of Si (percent) |
|---|---|---|---|---|
| | | C | Si | |
| Discharged from blast furnace. | | 4.5 | 0.7 | |
| Incorporated into trough from blast furnace. | 21.7 kg./t. of pig iron. | 4.4 | 2.0 | 80 |
| Incorporated into the apparatus of this invention. | 18.2 kg./t. | 4.4 | 2.0 | 95 |

Although the invention has been shown and described in terms of certain preferred embodiments thereof it will be clear that many changes and modifications will be obvious to one skilled in the art without departing from the true spirit and scope of the invention as defined in the appended claims.

What is claimed is:

1. In a method for treating pig iron in a vessel wherein a pretreating agent is contacted with said pig iron at the upper surface thereof and wherein said molten pig iron is stirred proximate the interface between said pretreating agent and said molten pig iron, the improvement which comprises disposing four driving shafts at the respective corners of a quadrilateral, each driving shaft driving a pair of horizontally spaced apart, substantially vertically oriented driving members, the lower ends of said driving members being immersed in the portions of said molten pig iron to be treated near the upper surface thereof, and rotating adjacent driving shafts in opposite directions so as to stir said molten pig iron near said interface.

2. The method of claim 1 further comprising repeatedly reversing the direction of rotation of said driving shafts.

3. The method of claim 2 wherein said four driving shafts are disposed on four corners of a square.

4. The method of claim 3 wherein said directions of rotation of said driving shafts are periodically reversed at a constant interval.

5. The method of claim 1 wherein said pretreating agent is a silicon addition agent.

References Cited

UNITED STATES PATENTS

| | | | |
|---|---|---|---|
| 3,687,430 | 8/1972 | Schulz | 75—58 |
| 3,695,946 | 10/1972 | Demeaux | 75—58 |
| 3,288,591 | 11/1966 | Stone | 75—60 |
| 3,597,191 | 8/1971 | Altland | 75—60 |
| 3,664,826 | 5/1972 | Kraemer | 75—58 |
| 3,729,183 | 4/1973 | Ando | 75—61 |
| 3,592,629 | 7/1971 | Ando | 75—58 |

L. DEWAYNE RUTLEDGE, Primary Examiner

P. D. ROSENBERG, Assistant Examiner

U.S. Cl. X.R.

75—61, 93 R; 266—34